United States Patent
Huang

(10) Patent No.: US 7,515,308 B2
(45) Date of Patent: Apr. 7, 2009

(54) IMAGE DEVICE COMBINED WITH SCANNING DEVICE AND VIDEO DEVICE

(76) Inventor: Yin-Chun Huang, 6F, No. 72-11, Lane 531, Sec. 1, Kuang-Fu Rd., Hsin-Chu City (TW)

( * ) Notice: Subject to any disclaimer, the term of this patent is extended or adjusted under 35 U.S.C. 154(b) by 1018 days.

(21) Appl. No.: 10/368,470

(22) Filed: Feb. 20, 2003

(65) Prior Publication Data

US 2004/0165222 A1  Aug. 26, 2004

(51) Int. Cl.
    *H04N 1/40* (2006.01)
(52) U.S. Cl. .................. 358/302; 358/296
(58) Field of Classification Search ......... 358/269–302; 348/42, 47–48
See application file for complete search history.

(56) References Cited

U.S. PATENT DOCUMENTS

| | | | | |
|---|---|---|---|---|
| 4,404,590 A | * | 9/1983 | Mayer et al. | 348/129 |
| 5,475,419 A | * | 12/1995 | Carbery | 348/59 |
| 5,488,416 A | * | 1/1996 | Kyuma | 348/296 |
| 5,495,343 A | * | 2/1996 | Ogura | 386/123 |
| 6,522,310 B1 | * | 2/2003 | Kim | 345/6 |
| 6,748,105 B1 | * | 6/2004 | Mancuso et al. | 382/154 |
| 2002/0140835 A1 | * | 10/2002 | Silverstein | 348/340 |
| 2002/0196487 A1 | * | 12/2002 | Kikinis | 359/35 |

\* cited by examiner

*Primary Examiner*—Thomas D Lee
*Assistant Examiner*—Stephen M Brinich
(74) *Attorney, Agent, or Firm*—Stolowitz Ford Cowger LLP

(57) ABSTRACT

The preset invention provides an image device, which combined scanning device with video device. Due to the scanning device and video device have image data treating elements are identical in function, thus, the two image data processing elements within the scanning device and video device could combine to be an image device to process the two different image data type and the image data could output by one image device to diminish the cost.

27 Claims, 3 Drawing Sheets

IMAGE DEVICE COMBINED WITH SCANNING DEVICE AND VIDEO DEVICE

BACKGROUND OF THE INVENTION

1. Field of the Invention

The present invention generally relates to an image device, and more particularly to combine a scanning device and video device to be an image device to output the image data of real object or scanning document.

2. Description of the Prior Art

Scanning devices, such as flatbed scanners, are well known in the art and produce machine-readable image data signals that are representative of a scanned document, such as a photograph or a page of printed text. In a typical scanning device application, the image data signals produced by a scanning device may be used by a personal computer to reproduce an image of the scanning document on a suitable display device, such as a CRT or a printer.

Furthermore, the other image outputting device, digital camera, is also well known in the art and produce machine-readable image data signal, especially for three-dimensional objects. In the conventional digital camera application, the image data of the real object produced by a image capturing device with photosensitive sensor to detect the reflected light and convert the reflected light into an digital signal. Then, the digital signal of the real object can be stored in the built in memory or portable pc card.

However, the transmission speed of the broadband transmission is increasingly, the image data capturing application is very important. Nevertheless, the conventional scanner or digital camera is an independent image-outputting device to output the image data. Thus, combination the scanner with camera in a computer system would have higher cost.

SUMMARY OF THE INVENTION

It is an object of this invention to combine a scanning device and a video device to be an image device to output the image data of a real object or scanning document.

It is another object of this invention to utilize the common image data processing elements to process the image data, which may be obtained by the scanning device or the video device.

According to the above-mentioned objects, the present invention provides an image device, which can combine the scanning device and the video device. The scanning device and the video device can have the same image data processing elements such as photosensor, multiplexes, AFE (analog-front-end) device, digital signal process device, and back-end outputting interface. Therefore, an image device can combine the above image data processing elements to process the image data, which can be obtained from the scanning device or video device to reduce the computer system space and diminish the cost.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

According to the conventional image device, either the scanning device or the video device cannot process and integrate the different image types, due to the scanning device or video device being independent image devices within the computer system. Thus, the present invention provides an image device, which can combine the function of scanning and capturing to be a single image device to process the image data from the scanning device or video device.

In the preferred embodiment of the present invention, the image data (digital signal) is outputted by utilizing the common back-end outputting interface to output the image data, which is obtained from the scanning device or video device, after the image data is processed by image data processing elements. The advantage of the common back-end outputting interface is that the connect port can be simplified to provide another device to connect therein.

Figure 1:
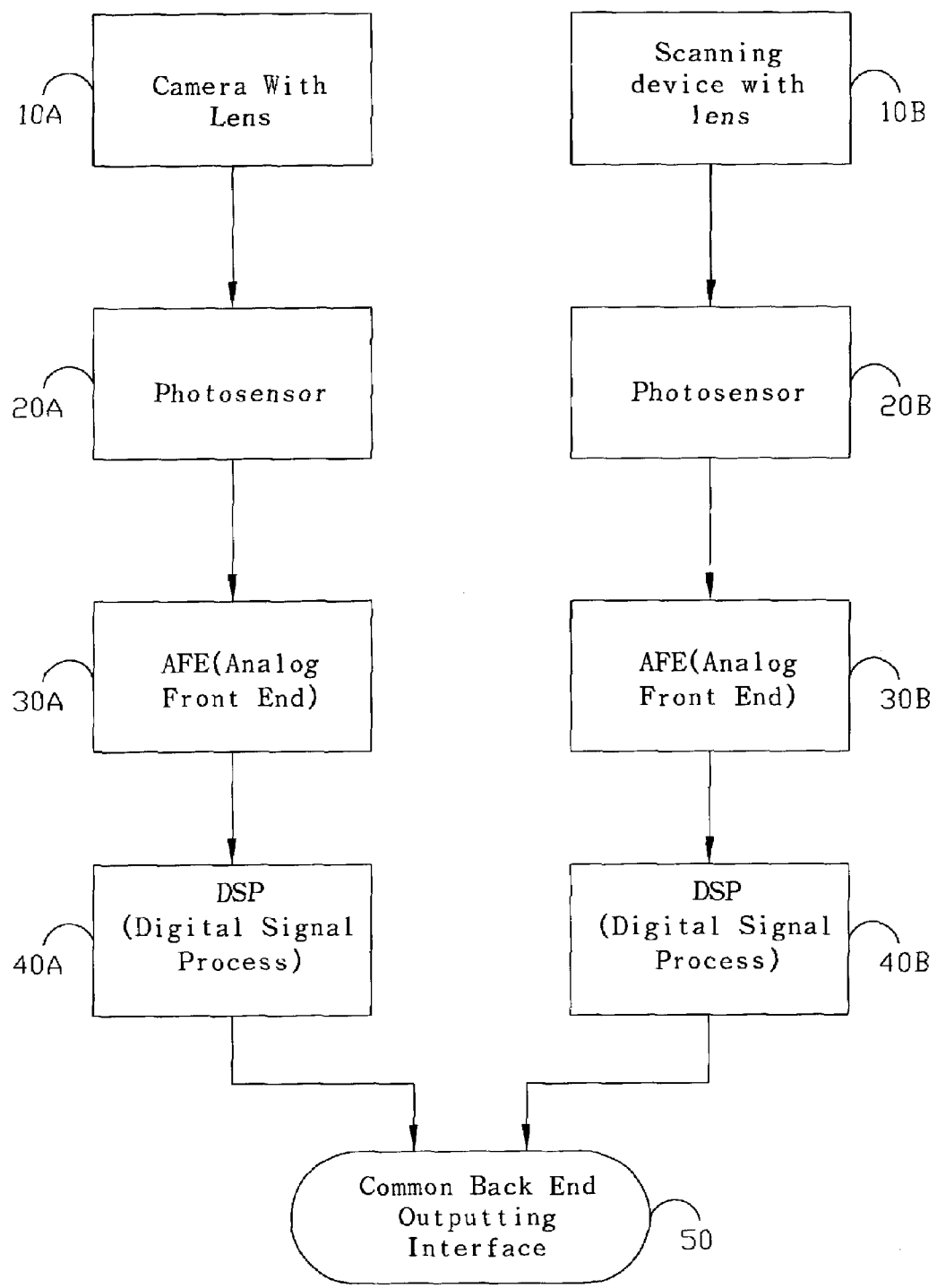
FIG. 1 is a block diagram showing the steps for utilizing the common back-end outputting interface to output the video image data and the scanning image data in accordance with a device disclosed herein.

FIG. 1 is a block diagram for showing the scanning device and a video device that utilizing the common back-end outputting interface to output the image data. Reference number 10A denotes the first image device, such as video device, which can be digital camera. The video device 10A utilized the first lens to capture the image data of the real object as the first image data, and focused on the first photosensor 20A. In the preferred embodiment of the present invention, the first photosensor 20A comprises CMOS (complementary metal-oxide-semiconductor) sensor or CCD (charge coupled device). Next, the first image data is transmitted to the first AFE (analog-front-end) device 30A, wherein the first AFE device 30A is used to convert the first image data into the first digital signal. Then, the first digital signal is transmitted to the first DSP (digital signal process) device 40A to process the first digital signal, wherein the first AFE 30A comprises ADC (analog to digital converting system.)

Furthermore, the present system having a second image device 10B, wherein the second image device 10B is a scanning device. During the scanning process, the scanning light illuminates the scanning document, and the scanning light is transmitted to the scanning device 10B with a second lens from the scanning document. Then, the second photosensor 20B receives the scanning light of the scanning document to obtain a second image data; wherein the second photosensor 20B comprises CMOS sensor or CCD. Thereafter, the second imaged data is transmitted to the second AFE device 30B to convert the second image data from the second analog signal into second digital signal. Next, the second digital signal is transmitted to the second DSP device 40B which processes the second digital signal.

The image data processing elements of the video device 10A and scanning device 10B have the same processing function in the present system. Thus, the video device 10A and scanning device 10B can be integrated to be a single image device to process the different image data type. The difference between the video device 10A and scanning device 10B is that the image data is three-dimensional type for video device 10A, and the two-dimensional type is for scanning device 10B. In order to combine the video device 10A and scanning device 10B, the common back-end outputting interfaces 50 may be used as the outputting interface to output the image data of video device 10A or scanning device 10B to the outputting device (not shown in FIG.). In the present invention, the common back-end outputting interfaces 50 comprise IEEEE 1394, wireless, or USB (universal serial bus).

Figure 2:
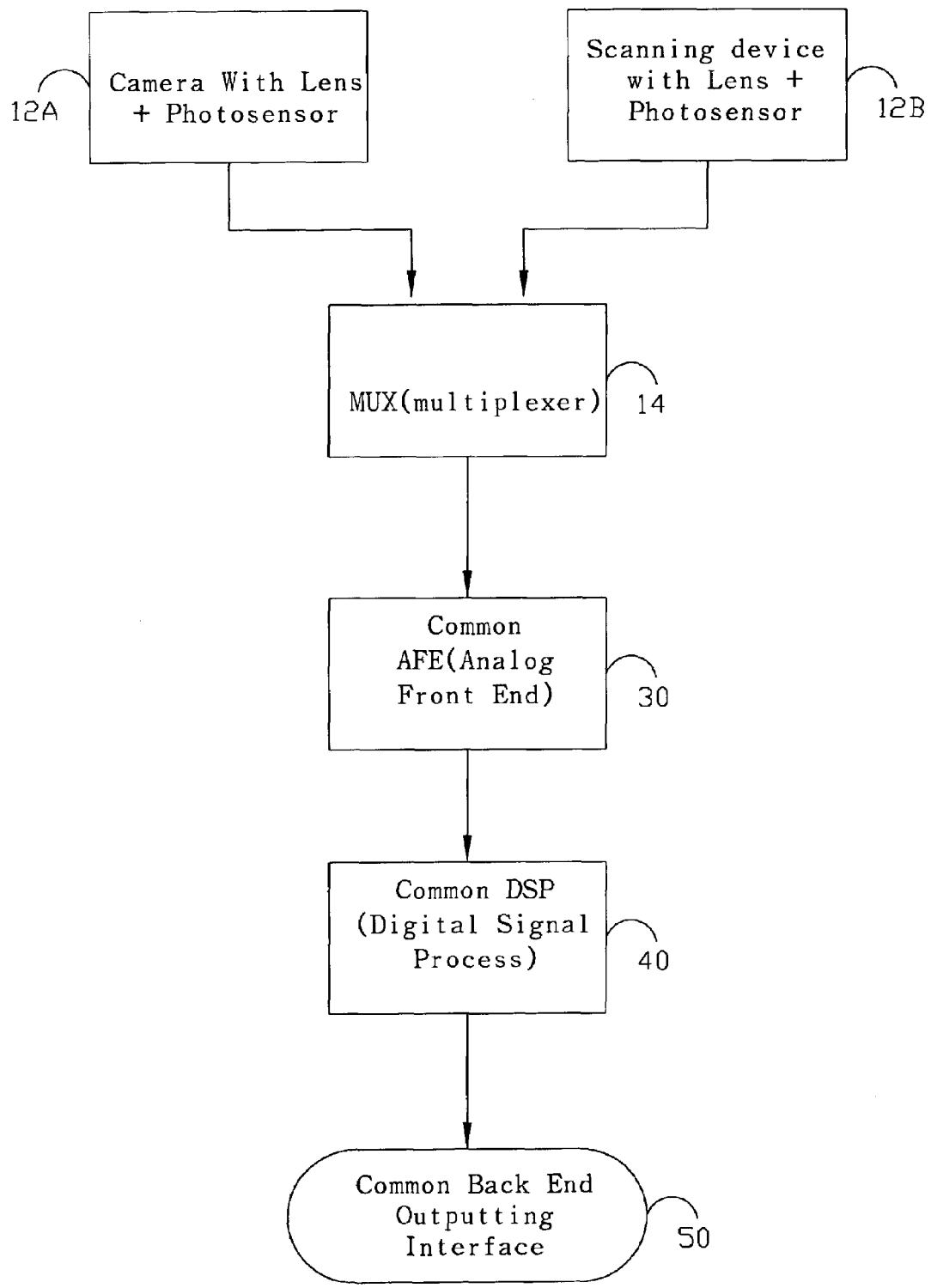
FIG. 2 is a block diagram showing the steps for processing the image data by common image data processing elements in accordance with a device disclosed herein.

In another preferred embodiment of the present invention, the image data of the video device 10A or scanning device 10B is processed by the common image data processing elements. FIG. 2 is a block diagram for showing the video device 12A and scanning device 12B that used the common image data processing elements to process the image data. The video device 12A having the first lens and a first photo sensor to capture the image data of the real object as the first image data, and to capture the first image data to the first photosensor within the video device 12A. In addition, during the scanning process, the scanning light source of the scanning device 12B is used to illuminate the scanning document to obtain a second image data. Then, the second image data is transmitted to the second lens, such that the second photosensor can receive the second image data.

Then, the first image data and second image data are communicated into the MUX (multiplexer) 14. The MUX 14 is used to treat the two type image data from the video device 12A and scanning device 12B. In this embodiment, the MUX 14 can treat the two different image data type and output the required imaged data type, for example, the first image data, which is captured by the video device 12A, and the second imaged data, which is scanned by scanning device 12B. Next, the first imaged data or second imaged data is transmitted into the common AFE device 30 to convert the first imaged data from first analog signal into the first digital signal (or second imaged data is converted from second analog signal into the second second digital signal.) Thereafter, the first digital signal (or second digital signal) is transmitted into the DSP device 40 to process the first digital signal (or second digital signal.) Finally, the first digital signal (or second digital signal) is outputted to the outputting device (not shown) by common back-end outputting interface 50.

Furthermore, the MUX 14, common AFE device 30, common DSP device 40, and common back-end outputting interface 50 are common image processing device elements, such that the image data of the video device 12A or scanning device 12B can be processed and output by the image processing elements within a single image device. Thus, either the image data of the real object or scanning object can utilize the common image processing elements to process to reduce the cost.

Moreover, the other preferred embodiment of the present inventions includes a photosensor 20 as the common image data processing element. According to the aforementioned embodiment, the photosensor 20 is independent of the video device 10A and scanning device 10B. The cost of the photosensor 20 is very important in the image device; thus, either the video device 10A or scanning device 10B has photosensor (as shown in FIG. 1 which denotes 20A and 20B) to detect the image data. Thus, the photosensor 20 can be included as the common processing element to detect the imaged light.

Figure 3:
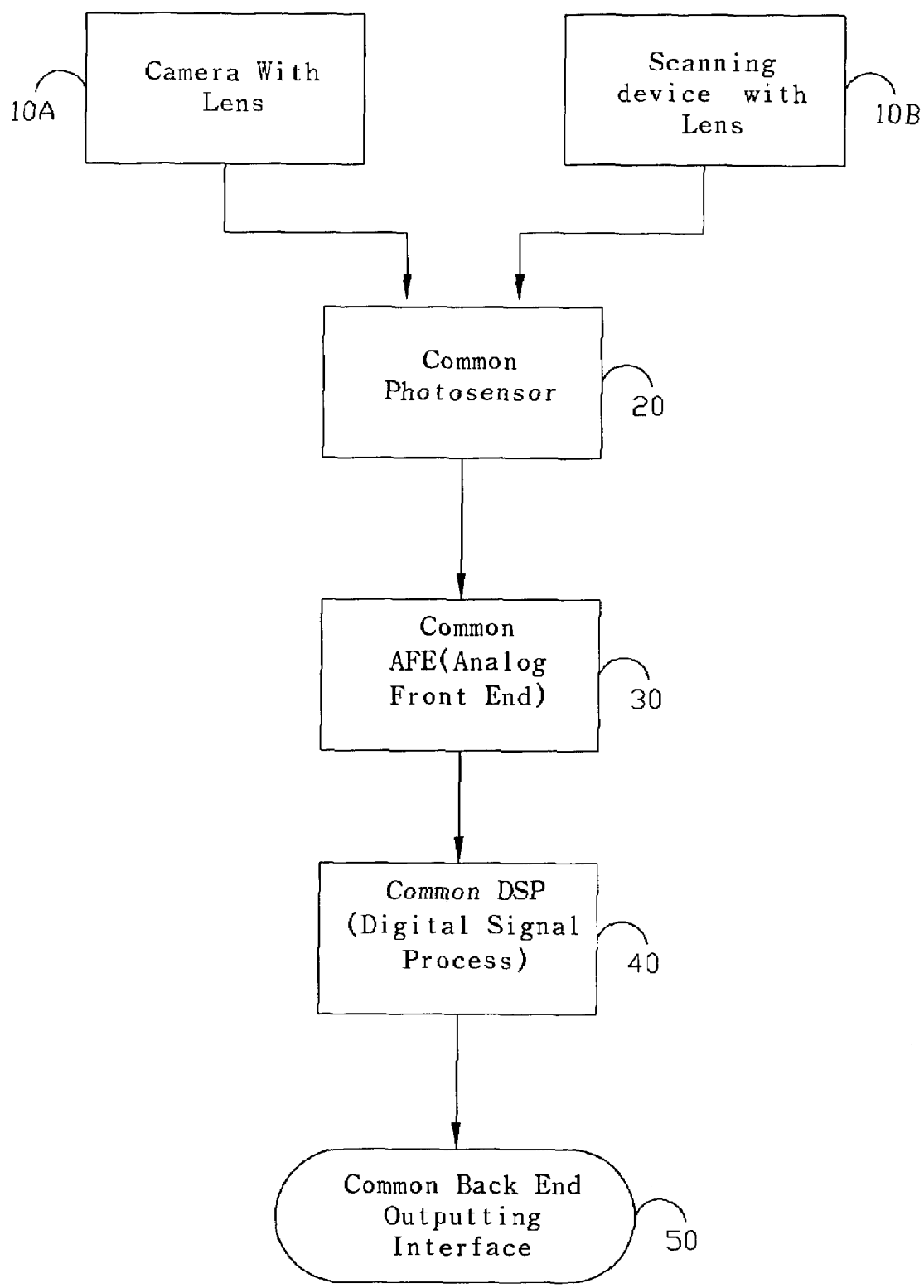
FIG. 3 is a block diagram showing the steps for detecting the real object by using the common photosensor element and processing by utilizing common processing elements in accordance with a device disclosed herein.

Referring to FIG. 3 is a block diagram for showing the video device 10A and scanning device 10B, which utilize the common photosensor 20 to detect the first and second imaged light. The first image device 10A may be a video device having the first lens to capture the first imaged data to the common photosensor 20; similarly, the second image device 10B has the second lens to reflect the second imaged data to the common photosensor 20. When the first and second image lights are captured or reflected to the common photosensor 20 by the video device 10A or scanning device 10B, the common photosensor 20 can treat the different type imaged data and output the required imaged data to the common AFE device 30. Similarly, the common AFE device 30 converts the first imaged data (or second imaged data) from the first analog signal (or second analog signal) to the first digital signal (or second digital signal.) Finally, the first digital signal (or second digital signal) is outputted to the outputting device by common back-end outputting interface 50.

According to abovementioned, the present invention provides an image device to diminish the space and the manufacturing. Furthermore, due to the video device and scanning device having the same processing elements, thus, the scanner and video output device could combine to be an image device.

Although specific embodiments have been illustrated and described, it will be obvious to those skilled in the art that various modifications may be made without departing from what is intended to be limited solely by the appended claims.

What is claimed is:

1. An imaging apparatus, comprising:
    a video device including a first lens, a first photosensor configured to capture first image data, a first analog-front-end component configured to convert said first image data into a first digital signal, and a first digital signal processing component configured to process said first digital signal;
    a scanning device including a second lens, a scanning light and a second photosensor configured to capture said scanning light from said second lens and convert said second light into second image data, a second analog-front-end component configured to convert said second image data into a second digital signal, and a second digital signal processing component configured to process said second digital signal; and
    a common back-end outputting interface configured to receive said first digital signal from said first digital signal processing component and receive said second digital signal from said second digital signal processing component.

2. The imaging apparatus according to claim 1, wherein said first and said second photosensors each comprise a complementary metal-oxide-semiconductor sensor.

3. The imaging apparatus according to claim 1, wherein said first and said second photosensors each comprise one or more charge coupled devices.

4. The imaging apparatus according to claim 1, wherein said first and said second analog-front-end components each comprise an analog to digital converting system.

5. The imaging apparatus according to claim 1, wherein said common back-end outputting interface comprises a IEEE 1394 interface.

6. The imaging apparatus according to claim 1, wherein said common back-end outputting interface comprises a USB (universal serial bus) interface.

7. The imaging apparatus according to claim 1, wherein said common back-end outputting interface comprises a wireless interface.

8. The imaging apparatus according to claim 1, wherein said video device is configured to capture said first image data and said scanning device is configured to convert said second light into said second image data at different times.

9. An imaging apparatus, comprising:
a first imaging component including a first lens and a first photosensor configured to capture first image data;
a second imaging component including a second lens and a second photosensor configured to capture a scanned image of a two-dimensional source object as second image data;
a multiplexer configured to receive the first image data and the second image data;
a common analog-front-end component configured to convert the first image data into a first digital signal and to convert the second image data into a second digital signal;
a common digital signal processing component configured to process the first and second digital signals; and
a common back-end outputting interface configured to output the first and second digital signals.

10. The imaging apparatus according to claim 9, wherein said first image device comprises a video device, and wherein said second image device comprises a scanning device.

11. The imaging apparatus according to claim 9, wherein said first image device comprises a digital camera, and wherein said first image data is captured from a three-dimensional source object.

12. The imaging apparatus according to claim 9, wherein said second image device comprises a flatbed scanner.

13. The imaging apparatus according to claim 9, wherein said analog-front-end component is configured to convert said second image data from a second analog signal to a second digital signal.

14. The imaging apparatus according to claim 9, wherein said first imaging component is configured to capture said first image data and said second imaging component is configured to capture said second image data at different times.

15. The imaging apparatus according to claim 9, wherein said common analog-front-end component comprises an analog to digital converting system.

16. The imaging apparatus according to claim 9, wherein said common back-end outputting interface comprises a IEEE 1394 interface.

17. The imaging apparatus according to claim 9, wherein said common back-end outputting interface comprises a universal serial bus (USB) interface.

18. The imaging apparatus according to claim 9, wherein said common back-end outputting interface comprises a wireless interface.

19. An imaging apparatus, comprising:
a video device having a first lens configured to capture first image data;
a scanning device having a scanning light and a second lens configured to capture said scanning light from said second lens as second image data;
a common photosensor to detect said first image data and said second image data;
a common analog-front-end device configured to receive said first and second image data from said common photosensor and to convert said first image data into a first digital signal and to convert said second image data into a second digital signal;
a common digital signal processor configured to process said first and second digital signals from said common analog-front-end device; and
a common back-end outputting interface configured to receive said first and second digital signals from said common digital signal processor.

20. The imaging apparatus according to claim 19, wherein said common analog front-end device comprises an analog to digital converting system.

21. The imaging apparatus according to claim 19, wherein said common back-end outputting interface comprises a IEEE 1394 interface.

22. The imaging apparatus according to claim 19, wherein said common back-end outputting interface comprises a universal serial bus (USB) interface.

23. The imaging apparatus according to claim 19, wherein said common back-end outputting interface comprises a wireless interface.

24. An imaging apparatus comprising:
means for capturing a first image and converting said first image into a first digital signal;
means for scanning a second image and converting said second image into a second digital signal; and
means for outputting said the first and second digital signals via a common back-end outputting interface.

25. The imaging apparatus of claim 24, wherein said means for capturing said first image comprises means for photographing said first image and means for converting a photograph into said first digital signal; and
wherein said means for scanning comprises means for reflecting a scanning light from a two dimensional source image to form said second imaging data and means for converting a scanned image into said second digital signal.

26. The imaging apparatus of claim 25, wherein said common back-end outputting device comprises a USB interface.

27. The imaging apparatus of claim 25, wherein said common back-end outputting device comprises a IEEE 1394 interface.

* * * * *

UNITED STATES PATENT AND TRADEMARK OFFICE
CERTIFICATE OF CORRECTION

PATENT NO. : 7,515,308 B2  Page 1 of 1
APPLICATION NO. : 10/368470
DATED : April 7, 2009
INVENTOR(S) : Huang It is certified that error appears in the above-identified patent and that said Letters Patent is hereby corrected as shown below:

At column 6, line 18, please replace "analog front-end" with --analog-front-end--.
At column 6, line 34, please replace "said the first" with --said first--.

Signed and Sealed this

Eighth Day of June, 2010

David J. Kappos
*Director of the United States Patent and Trademark Office*